United States Patent
Luckenbill

(10) Patent No.: US 9,771,121 B2
(45) Date of Patent: Sep. 26, 2017

(54) TOWED STRADDLE RIDING ATTACHMENT FOR WAKEBOARDS

(71) Applicant: Kyle Alan Luckenbill, Hilton Head Island, SC (US)

(72) Inventor: Kyle Alan Luckenbill, Hilton Head Island, SC (US)

(73) Assignee: Kyle Luckenbill, Hilton Head Island, SC (US)

(*) Notice: Subject to any disclaimer, the term of this patent is extended or adjusted under 35 U.S.C. 154(b) by 0 days.

(21) Appl. No.: 15/224,557

(22) Filed: Jul. 31, 2016

(65) Prior Publication Data
US 2017/0043845 A1 Feb. 16, 2017

Related U.S. Application Data

(60) Provisional application No. 62/200,107, filed on Aug. 2, 2015.

(51) Int. Cl.
| | | |
|---|---|---|
| *B63B 35/81* | (2006.01) | |
| *B62K 19/30* | (2006.01) | |
| *B63B 35/79* | (2006.01) | |
| *B63B 35/73* | (2006.01) | |
| *B62K 13/08* | (2006.01) | |

(52) U.S. Cl.
CPC .............. *B62K 19/30* (2013.01); *B62K 13/08* (2013.01); *B63B 35/731* (2013.01); *B63B 35/79* (2013.01); *B63B 35/81* (2013.01); *B63B 2035/735* (2013.01)

(58) Field of Classification Search
CPC ..................... B63B 2035/818; B63B 35/81
See application file for complete search history.

(56) References Cited

U.S. PATENT DOCUMENTS

| | | | | |
|---|---|---|---|---|
| 3,642,299 A * | 2/1972 | Garcia | ................. | B62B 15/007 280/16 |
| 3,803,653 A * | 4/1974 | Trostad | ................. | B63B 35/731 114/246 |
| 7,547,023 B2 * | 6/2009 | Yau | ...................... | B62B 13/043 280/16 |

* cited by examiner

*Primary Examiner* — Edwin Swinehart

(57) ABSTRACT

The WakeMX system is a specially designed BMX bike frame used for towable water sports activities. It has a uniquely designed Swing arm action that allows for "Carving" on the water to change angles of direction by the rider. It has a Quick Release system to be released from the towline, and a universal mounting track that allows the rider to attach the WakeMX system to any existing wakeboard on the market. The WakeMX is capable of completing all of the same tricks a BMX bike can do on land but converted for water sports. It feels and rides just like a BMX, just adapted to be used as a towable water sport activity. The vision is to develop an entirely new wake sport activity by bringing BMX riding to the water sports family.

8 Claims, 9 Drawing Sheets

TOWED STRADDLE RIDING ATTACHMENT FOR WAKEBOARDS

Figure 1:
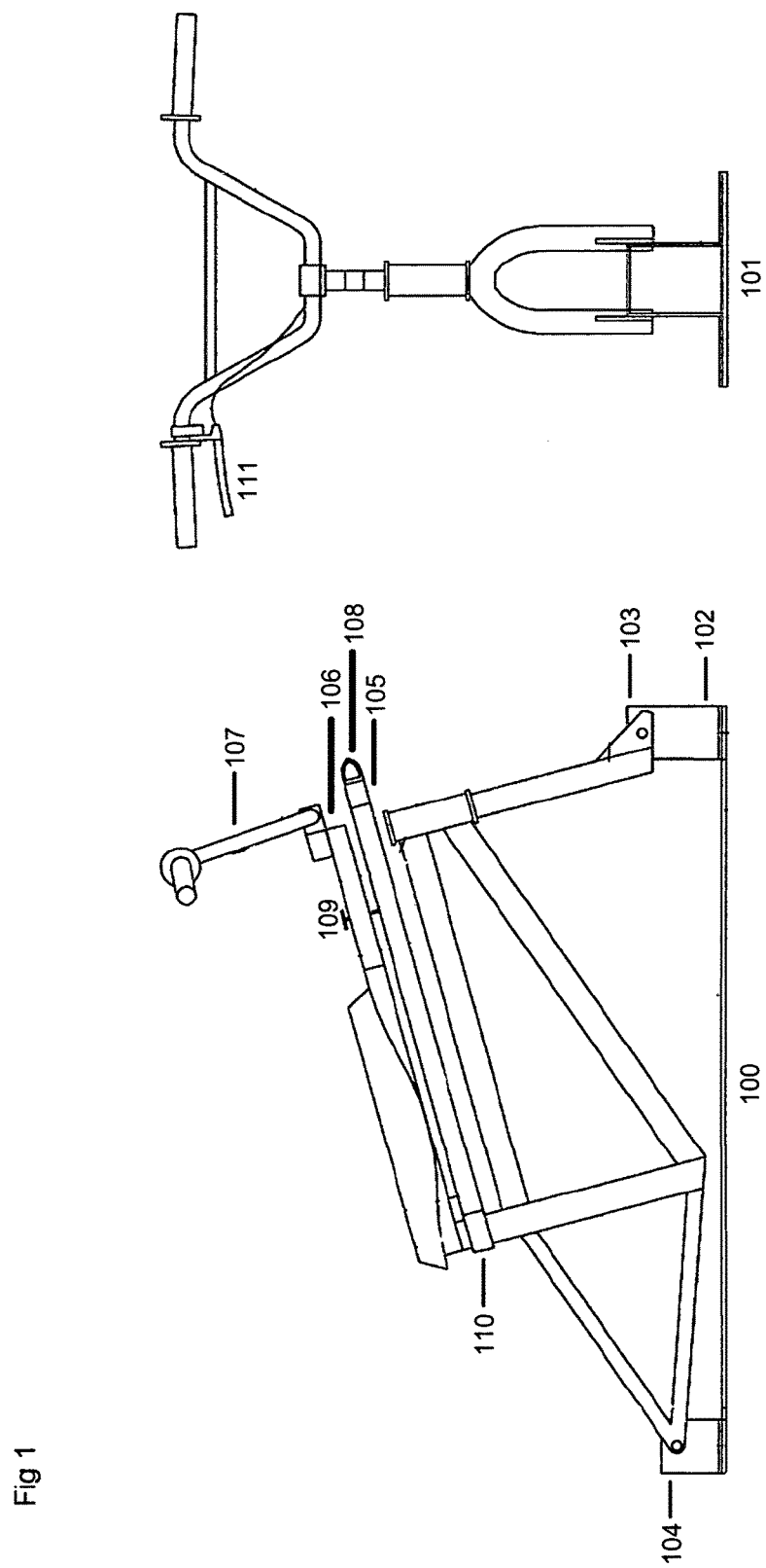
Figure 2:
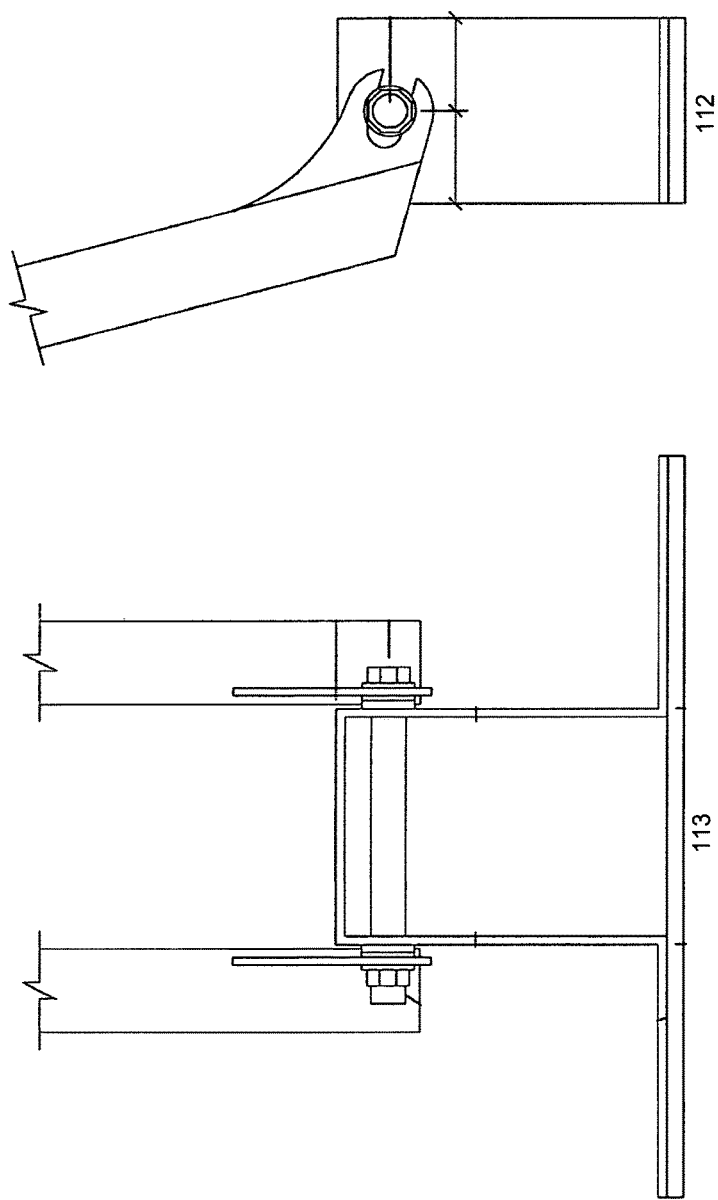
Figure 3:
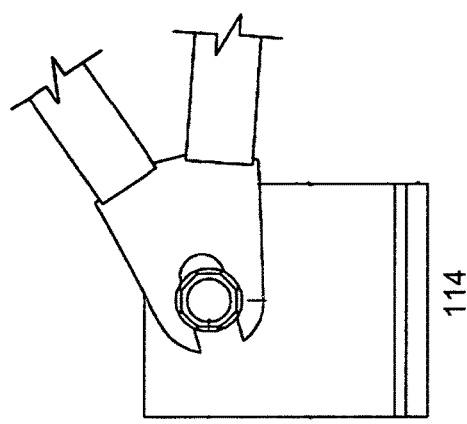
Figure 3:
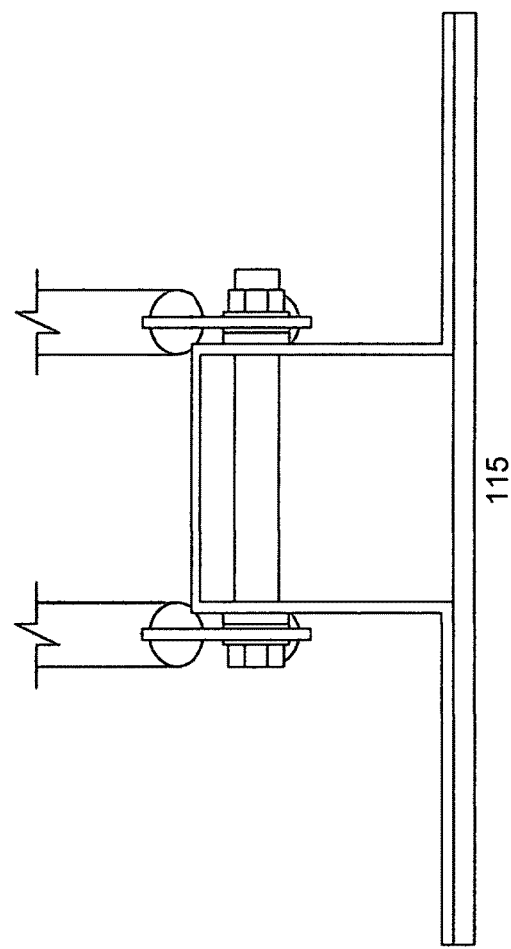
Figure 4:
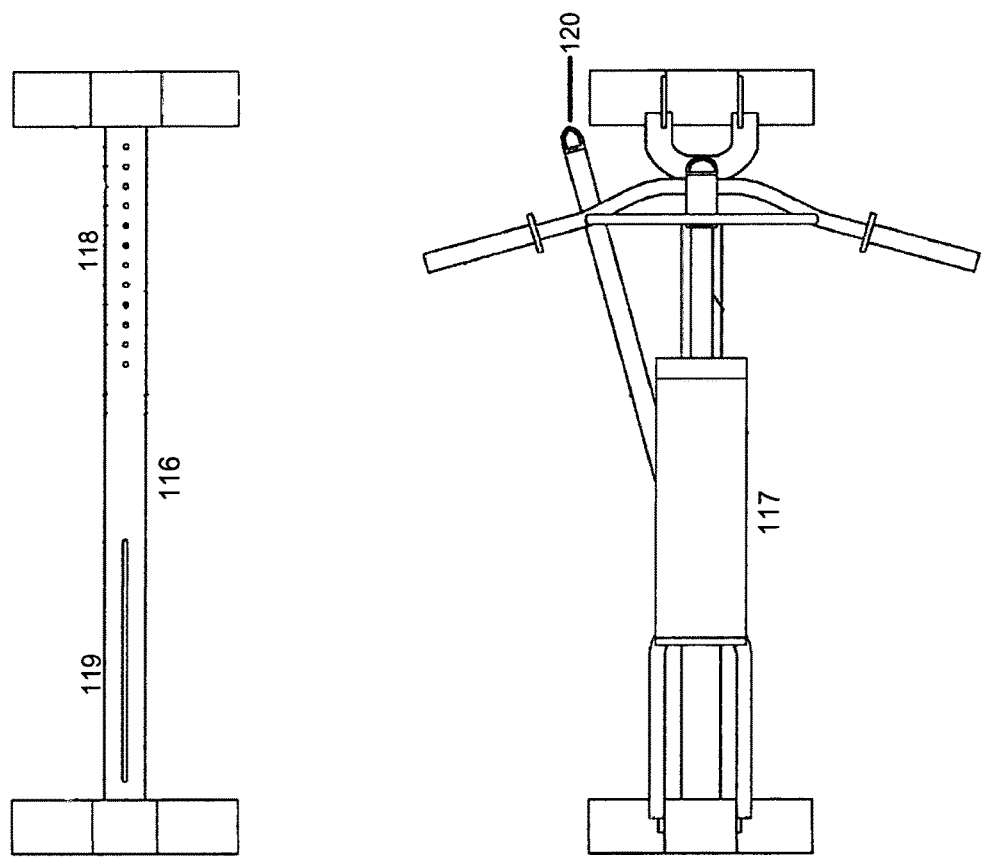
Figure 5:
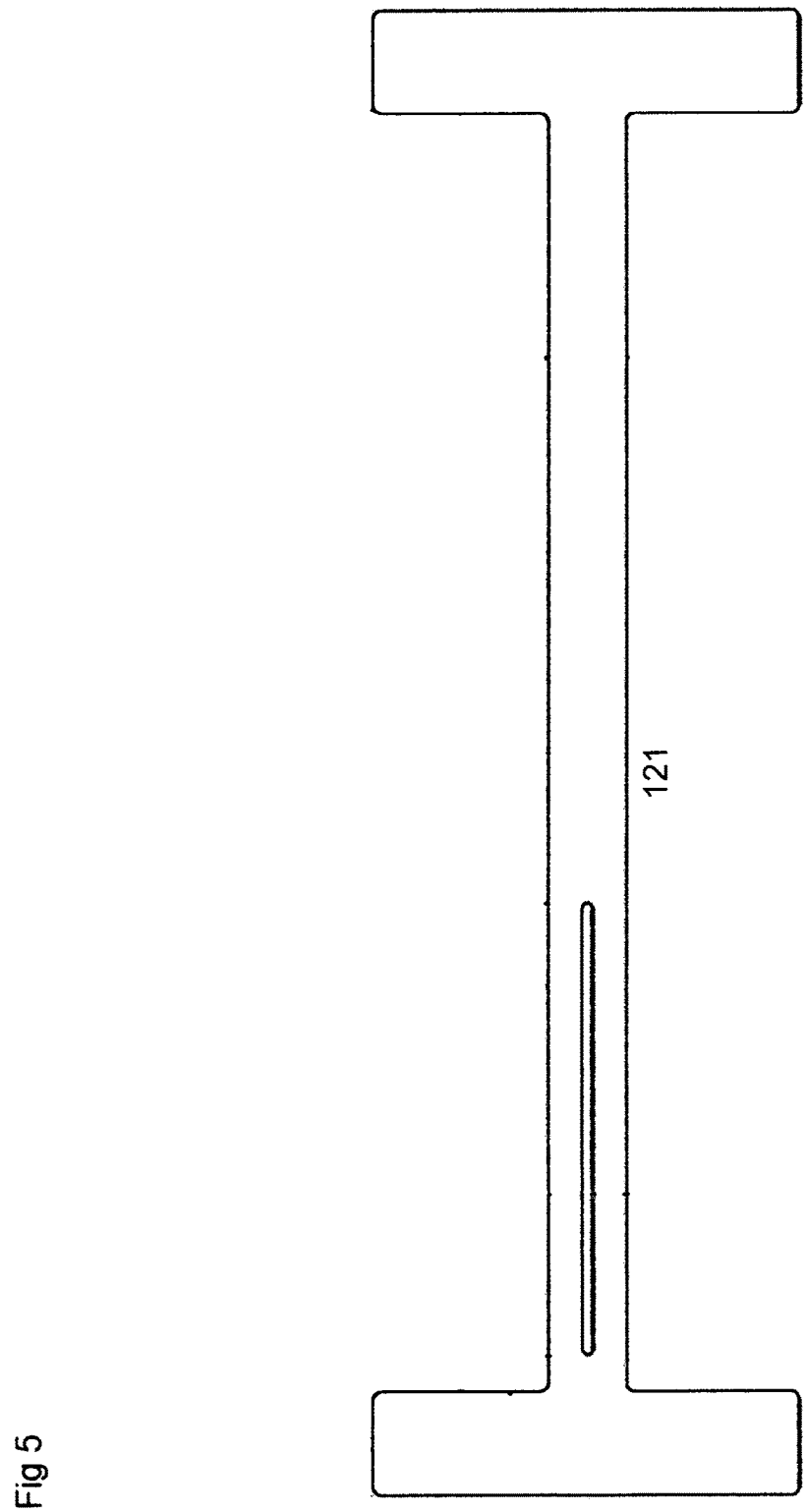

The Towed Straddle Riding Attachment for Wakeboards is a specially designed BMX bicycle frame for use on the water for towable wake sports. It has three specially designed areas that make it unique. The First component is the lower track assembly allowing the Towed Straddle Riding Attachment for Wakeboards to be attached to any existing wakeboard on the market. The second is the swing arm mounted on top of the BMX frame to allow the rider to feel like he or she is riding a BMX on land but on water being towed behind a boat or cable park winch system. This swing arm action allows for "Carving" to take place. Without this unique design component the rider would be forced to ride to wherever they are being towed. It allows the rider to change direction and be free to ride the Towed Straddle Riding Attachment for Wakeboards in any angle he or she chooses described as "Carving". The Third component is the quick release system. This allows the rider to be released from the towline by simply pulling in on the break lever. The Vision of the Towed Straddle Riding Attachment for Wakeboards is to bring BMX bike riding to the wake sports industry to be used for towable water sports. The Towed Straddle Riding Attachment for Wakeboards is designed to be used with any existing wakeboard on the market to be ridden the same way a BMX on land is but on the water as a towable water sport. Throughout these documents the Towed Straddle Riding Attachment for Wakeboards will be explained in great detail to how all of the unique functions work and why they are important to this patented design.

Defined—BMX—Small bike frame used in skate parks and for aggressive street trick riding. Designed for extreme sports and tricks.

DETAILED DESCRIPTION OF INVENTION

Detailed Description of Drawings

FIG. 1—

This is a complete overview of the WakeMX showing side 100 and front 101 views. As shown from the bottom is the lower mounting track 102 that is the universal mounting system for any wakeboard on the market. Showing how the Frame is attached to the front 103 and rear 104 forks of the WakeMX to the Lower mounting track. The Wakeboard is attached directly to the bottom of the lower mounting track. The rider stands directly on the wakeboard with the WakeMX in between his or her legs. The Swing arm assembly 105 is shown right above the top tube set on the frame of the WakeMX. The stationary arm 106 is shown right above the swing arm assembly. The stationary arm is where the handlebars 107 are mounted to on the WakeMX. The only moving part on the WakeMX is the swing arm assembly. At the end of the swing arm is where the quick release system 108 is located and where the towline is attached. Located in the center of the stationary arm and swing arm is a temporary pin 109. This pin is in place for the rider and used to temporarily hold the swing arm in place while the rider gets up and riding on top of the water. Then the rider is free to remove the pin to activate the swing arm enabling it to move from side to side. Noted again the Swing arm Action is the only moving part on the WakeMX. Everything else is stationary and fixed in its location. The rider only needs the swing arm to move from side to side to give him or her the ability to carve from side to side. The rider uses their knees to hold and control the swing arm action. The Swing arm Regulator fitting 110 also plays a roll in restricting the range of motion of the swing arm for the rider while they are gaining experience riding. Noted the regulator is the fitting that can be replaced by the rider for a wider range of motion. On the front view 101 of the WakeMX the brake lever 111 is shown. This is the system the rider uses to pull in on to release the quick release system. Notice on the side view 100 of the WakeMX the pivot point of the Swing Arm assembly is located right where the center of the riders body will be while riding. Giving the rider the center pivot point and center of gravity so he or she can carve correctly on the water. Given example—an axle on a wheel must be in the center to rotate correctly. If the axle is offset the wheel will not rotate evenly. Same concept applies here, as the rider must be directly in the centerline of the pivot point of the towline where the swing arms pivot point is located allowing the rider to rotate at the center point of the towline, WakeMX and Wakeboard.

FIG. 2—

This is the complete side 112 and front 113 view of how the lower mounting track attaches to the WakeMX frame. Notice on the front fork the level of raise at 5". This gives the WakeMX the correct stance of a regular BMX bike. This gives the same feel to the rider of a true BMX stance with the raised front end of the bike.

FIG. 3—

This is a complete side 114 and front 115 view of how the lower mounting track attaches to the WakeMX frame. Notice on the rear forks how the level has been lowered in the rear end sitting at 3¼'. This gives the appropriate ride level of the rear portion of the WakeMX to give the rider the real feel of a BMX with proper stance.

FIG. 4—

This shows the Top view of the Lower Mounting Track system 116, and the Top view of the WakeMX 117. Notice on the topside of the mounting track there are 1" displaced holes 118 for mounting and a track slide mount 119 in the rear. This is because wakeboard bindings (boots) mounting is always 1" apart on the mounting holes on the wakeboard. I have placed single 1" mounting holes to line up directly with the mounting holes on the wakeboard for the bindings. This is so the WakeMX will not slide up and down the board while in operation. The slide has been incorporated in the rear because wakeboards come in all different sizes the mounting holes are always 1" apart, but the distance between both of the bindings are always different. So the slide has been incorporated in the rear to make sure the WakeMX lower mounting track will always have a place to attach in the rear to the wakeboard. The top view of the WakeMX shows how the swing arm 120 operation works from side to side.

FIG. 5—

This shows the complete overview of the bottom of the mounting track 121. This shows the laser cut operation in the manufacturing process. Noted the 1" mounting holes in the front are not shown in this figure. The Mounting track is completely comprised of Stainless Steel.

FIG. 6—

This shows a complete overview of the regulator fittings. These fitting can be replaced and changed out on the WakeMX by the rider for multiple different angles 122,123, 124 offered. The purpose of the regulator is so that it restricts the range of motion of the swing arm action. This is so the rider can increase their ability to use more of the range of motion by the swing arm as their ability to ride the WakeMX increases. The regulator is located under the swing arm in the swing arm assemble. Noted this is shown in more detail to its location in the swing arm breakdown drawing.

FIG. 7—

This shows the Swing Arm action complete in assembly. The lower tube set 125 is the top portion of the WakeMX frame. The middle arm is the swing arm action 126. The top bar is the stationary arm 127 where the handlebars attach. Note the Swing arm is the only moving part on the WakeMX system.

FIG. 8—

This is a complete breakdown of the swing arm assembly 128. From the Top of 128 breakdown. Tension bolt 129 holds the entire assembly together. Washer fitting 130 for the tension bolt head to compress to. The stationary arm 131 where the handlebars are attached to. The swing arm assembly 132 at the end of the swing arm is the quick release assembly. The swing arm moves freely from side to side to give the rider the ability to carve. The regulator fitting 133 to restrict the movement of the swing arm. The seat post housing stud 134 for the entire assembly to be fitted to. Noted again the swing arm is the only moving piece in the entire WakeMX system. Correct torque specification is required on the top bolt 129 so the swing arm is not compressed so much that it cannot move freely. The side view 135 shows the entire assembly assembled. A top view of the entire assembly 136.

FIG. 9—

Figure 6:
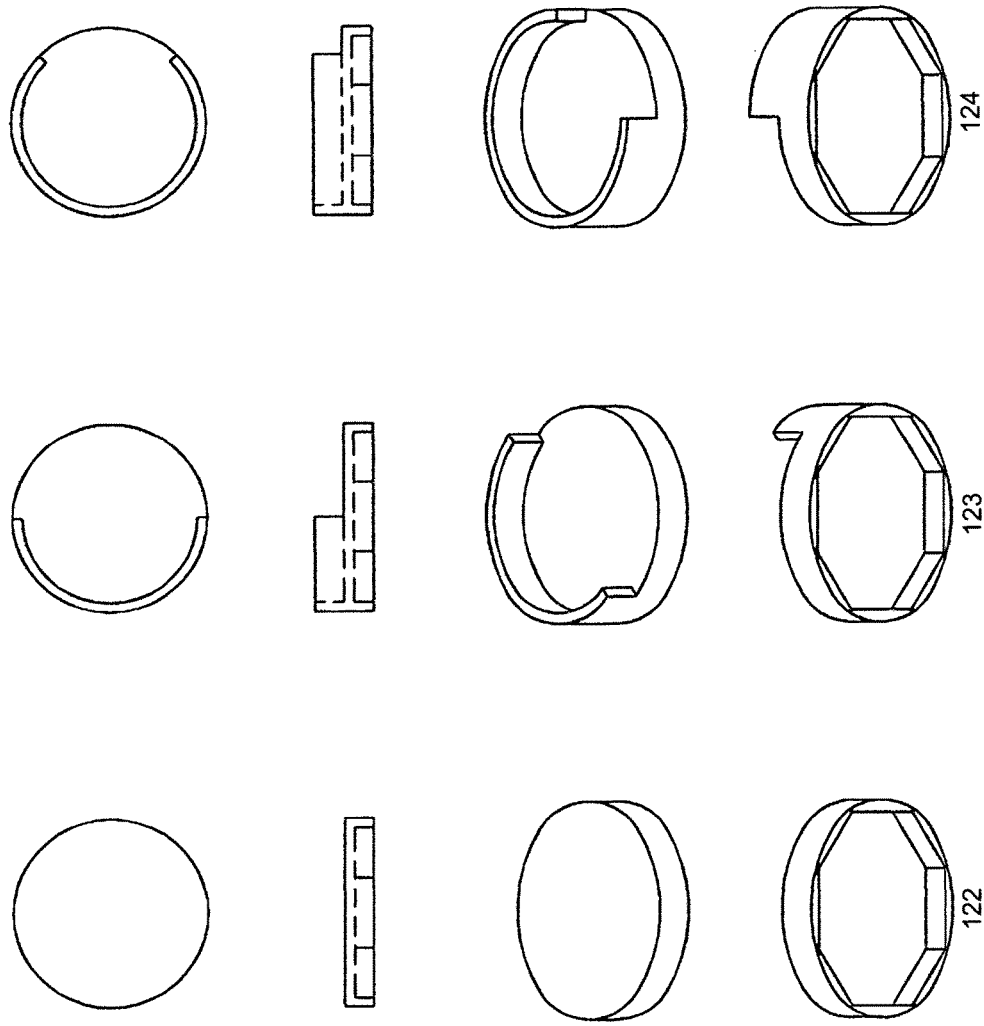
Figure 7:
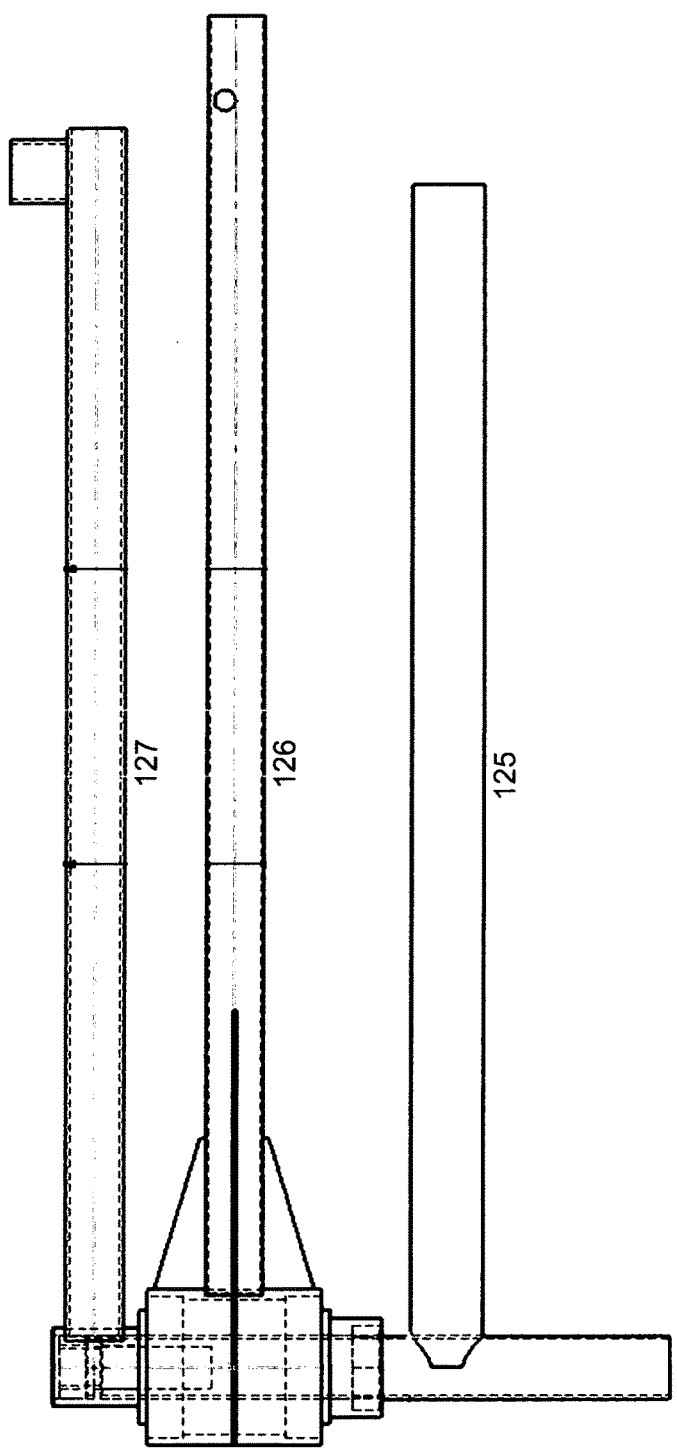
Figure 8:
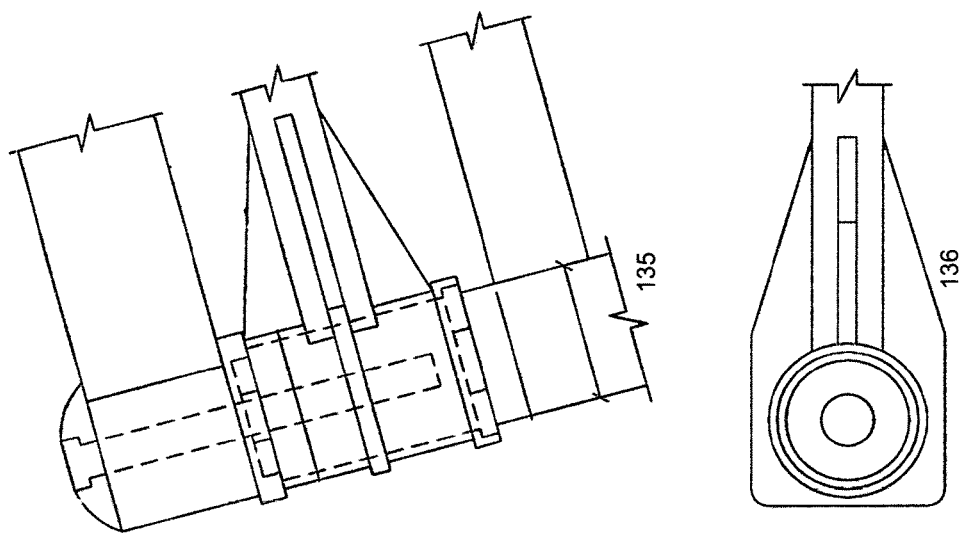
Figure 8:
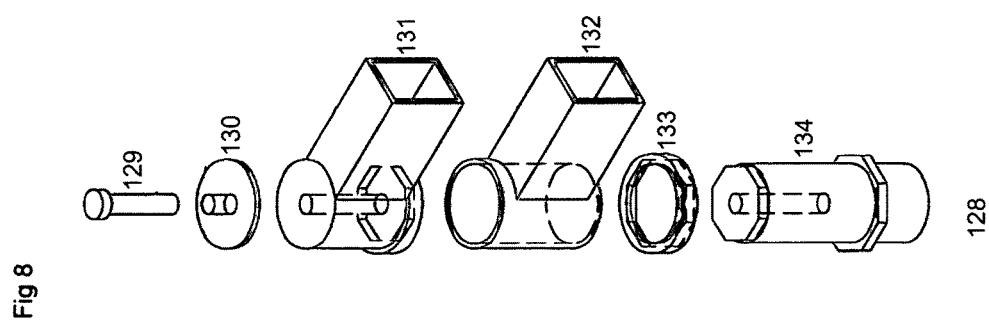
Figure 9:
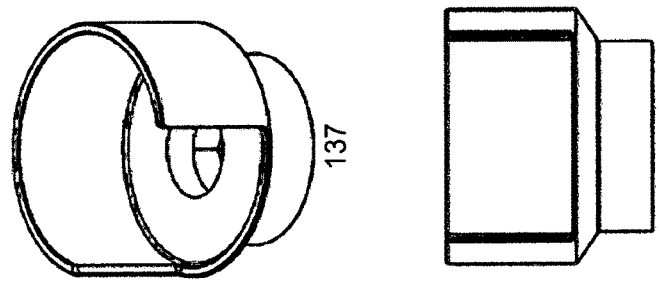
Figure 9:
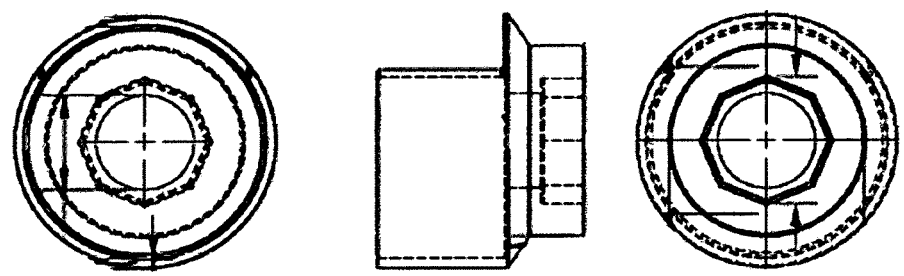

This is a more detailed overview of the 35-degree regulator fitting 137. This is the swing arm action restriction fitting that will come with the WakeMX system. All of the other regulator fittings that are shown in FIG. 6 will be sold separately.

The entire WakeMX is comprised of 4130 Chromalloy, Aluminum, and Stainless Steel, some plastic components.

The invention claimed is:

1. A Towed Straddle Riding Attachment for Wakeboards, the system comprising: a lower universal mounting track allowing the system to be attached to a wakeboard, a swing arm that provides a pivot point of tow near a center of the rider for providing center of gravity pivoting allowing the rider to carve on the water while staying in control of the system by the riders legs to control the angle of carve with the swing arm action, a regulator fitting that restricts the swing arm action controlling the amount of angle of carving, a quick release system located at a end of the swing arm action for safety release.

2. A Towed Straddle Riding Attachment for Wakeboards according to claim 1, wherein the lower mounting track comprising of 1" separation of pilot holes for wakeboard attachment in a front of the system for the wakeboard not allowing any sliding from front to back with the system to the wakeboard.

3. A Towed Straddle Riding Attachment for Wakeboards according to claim 2, wherein the lower mounting track consists of a track slide attachment in the rear for the wakeboard rear attachment, due to different sizes of wakeboards this allows the system to always have a mounting point on the rear of the wakeboard for a secure attachment.

4. A Towed Straddle Riding Attachment for Wakeboards according to claim 1, wherein the system of the swing arm action moves the tow pivot point of the system to the center of the rider with a ridged arm attached to a bearing sleeve with perpendicular cylinder that is aligned with a seat post and system components at the center of the rider.

5. A Towed Straddle Riding Attachment for Wakeboards according to claim 4, wherein a swing arm tow line is attached to an outer most point of the swing arm located at the front of a system, the pivot point is moved along the ridged swing arm down to the center of the system where the bearing sleeve assemble is located at the seat post within the center of the rider and the system.

6. A Towed Straddle Riding Attachment for Wakeboards according to claim 1, wherein the regulator fitting restricts the motion of the swing arm with a coupler housing resting on the swing arm at the outer most edges of angled carve by the rider.

7. A Towed Straddle Riding Attachment for Wakeboards according to claim 1, wherein the quick release system is located at the outer most point of the swing arm where a tow line attaches to for quick release of the tow line controlled by a hand lever located on the handlebar.

8. A Towed Straddle Riding Attachment for Wakeboards according to claim 7, wherein the quick release is operated by the hand lever with components of a housed cable line that moves internally back and forth motion to pull in on the quick release system to allow the tow line to be released.

\* \* \* \* \*